(12) United States Patent
Choi et al.

(10) Patent No.: US 6,285,376 B1
(45) Date of Patent: Sep. 4, 2001

(54) TRIANGLE TRAVERSING METHOD AND A RASTERIZER ADOPTING THE SAME

(75) Inventors: Sang-gil Choi; Young-cheul Wee, both of Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 08/706,831

(22) Filed: Sep. 3, 1996

Related U.S. Application Data

(63) Continuation-in-part of application No. 08/313,818, filed on Sep. 28, 1994, now abandoned.

(51) Int. Cl.$^7$ ................................................ G06T 11/00
(52) U.S. Cl. ............................................................ 345/441
(58) Field of Search ................................. 345/441–443, 345/433

(56) References Cited

U.S. PATENT DOCUMENTS

| | | | |
|---|---|---|---|
| 5,369,739 | * 11/1994 | Akeley | 345/434 |
| 5,598,517 | * 1/1997 | Watkins | 345/461 |

OTHER PUBLICATIONS

Foley et al. "Computer Graphics Principles And Practice" pp 9–15, 96–104, 165–175, 1990.*

English translation of Korean Patent Application No. 93–22956.

* cited by examiner

*Primary Examiner*—Almis R. Jankus
(74) *Attorney, Agent, or Firm*—Rothwell, Figg, Ernst & Manbeck

(57) ABSTRACT

A triangle traversing method includes a primary traversing and a secondary traversing wherein the primary and secondary traversings are orthogonally related to each other. In the primary traversing, a primary proceeding is performed for producing a reference point and if the primary proceeding passes over an edge of the triangle, a shifting is made to the outermost point related to the previous reference point and then the primary proceeding is again performed. In the secondary traversing, outward proceedings from the reference point produced in the primary traversing are repeatedly performed until all corresponding line points within the triangle are traversed. The primary and secondary traversings are repeatedly and alternately performed, until all the points within the triangle are traversed.

9 Claims, 5 Drawing Sheets

TRIANGLE TRAVERSING METHOD AND A RASTERIZER ADOPTING THE SAME

This application is a continuation-in-part of application Ser. No. 08/313,818 filing date Sep. 28, 1994 now abandoned.

BACKGROUND OF THE INVENTION

The present invention relates to a computer graphics system, and more particularly, to a triangle traversing method and a rasterizer adopting the same, in which Phong shading can be efficiently performed.

In computer graphics, the methods for coloring objects can be divided into two types: one where the color value of a pixel at a curved surface of the object is directly calculated (for example, by ray tracing or radiosity) and another where the object is modeled as a polyhedron having constant color values throughout each face. In other words, a smooth surface is approximated as a polyhedron in order to simplify hidden-surface elimination, and shading calculations are employed to restore the surface's smooth appearance.

Shading algorithms such as Gouraud shading and Phong shading have been suggested. In shading, normals are computed at the vertices of each face and approximate the normal to the true surface at the vertex. Each vertex normal is then used to compute a vertex color value. Then, in Gouraud shading, the color values inside the face are linearly interpolated from the vertex color values. Thus, Gouraud shading, although very simple, has deficiencies, for example, Mach band effects. For remedying such deficiencies, Phong shading has been proposed, in which vertex normals instead of vertex shades are linearly interpolated and then the shade at each pixel is determined based on the shading equation. However, Phong shading entails a complex calculation, which leads to difficulty in its hardware implementation. In addition, the software implementation of Phong shading requires an immense amount of processing time. For instance, for a diffused reflection model, the calculation of the color value at any pixel based on its normal according to the following equation (1) requires seven addition operations, six multiplication operations, one division operation, and one square root calculation.

$$F = I_{diffuse} = \frac{I_d K_d L N}{|L||N|} \quad (1)$$

Here, F denotes a color value; $I_d$ denotes the intensity of a point light source; $K_d$ denotes a coefficient of scattering refection; L denotes a unit normal vector with respect to the surface; and N denotes a unit vector of the surface.

To reduce the amount of the above computation which is required for performing Phong shading, a new algorithm typically called "fast Phong shading" has been proposed by Gary Bishop and David M. Weimer, in which the shading equation is approximated into two terms of a Taylor series. Consequently, by fast Phong shading, the linear interpolation of normals is converted into a quadratic interpolation of shades.

Meanwhile, as the polygon constituting the faces of the polyhedron, a triangle is commonly used in order to obtain high efficiency by reducing needless overhead since, if span data for a polygon (not a triangle) is generated from a geometric processor and applied to a rasterizer, the workload of the geometric processor is so much greater than that of the rasterizer, so that the rasterizer is often idle, which diminishes the system's overall efficiency. Accordingly, it follows that the polygon span data should be converted into triangle span data using the geometric processor for attaining the load distribution.

The amount of rasterizer calculation depends on how the triangle is to be traversed. Therefore, a more efficient traversing method is required, for increasing the speed of the graphics system. To do this, the Pineda algorithm has been proposed to traverse a triangle efficiently. However, this algorithm has a disadvantage in that its control logic is so complex that its hardware implementation is difficult. In addition, this algorithm performs needless calculations which relate to pixels outside the triangle.

SUMMARY OF THE INVENTION

Accordingly, an object of the present invention is to provide a highly efficient traversing method for use in the rasterizer of a computer graphics system.

Another object of the present invention is to provide a rasterizer adopting the above traversing method.

To attain the above first object of the present invention, there is provided a method for traversing a triangle defined by three vertices, comprising:

a first step for determining two of the three vertices as a starting point and a final point, respectively, based on a predetermined primary traversing direction;

a second step for assigning said starting point to a reference point, a edge point;

a third step for updating the reference point such that, if a pixel shifting from the reference point in the primary traversing direction passes over an edge of the triangle, the updated reference point has an address shifted by one pixel in the primary traversing direction from one edge point selected between the first and second edge points based on the slope of the passed edge, and otherwise, the updated reference point has an address shifted by one pixel in the primary traversing direction from the previous reference point;

a fourth step for performing both outward traversing from the updated reference point, until the points of the line within the triangle are all traversed and storing the two outermost points traversed in the outward traversings as the first and second edge points, respectively; and repeatedly performing said third and fourth steps, until said final point is traversed.

Here, in a preferred embodiment, the third step includes the steps of:

shifting the reference point by one pixel in the primary traversing direction;

producing three edge function values of the shifted reference point in order to check whether the shifted reference point is located within the triangle;

producing image values of the shifted reference point, provided that the three edge function values are all located-in values; and selecting one between the first edge point and second edge point, provided that any one of the three edge function values is a located-out value, wherein the selection is made based on the slope of an edge having a located-out value, and assigning the point shifted by one pixel in the primary traversing direction from the selected edge point as the reference point then producing image values of the reference point.

In addition, the image values are produced using a quadratic interpolation according to fast Phong shading.

The primary traversing direction is deemed the −Y direction and the outward traversings are deemed the ±X directions.

To attain the other object of the present invention, there is provided a rasterizer comprising:

a traversing control unit for producing an address of a traversing point by performing the triangle traversing described above;

a boundary checking unit for checking whether the traversing point is located within the triangle;

a function processing unit for producing the image values of the traversing point determined to be located within the triangle; and an output processing unit for performing a hidden-surface elimination for the point whose image values have been produced, and then updating a frame buffer.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
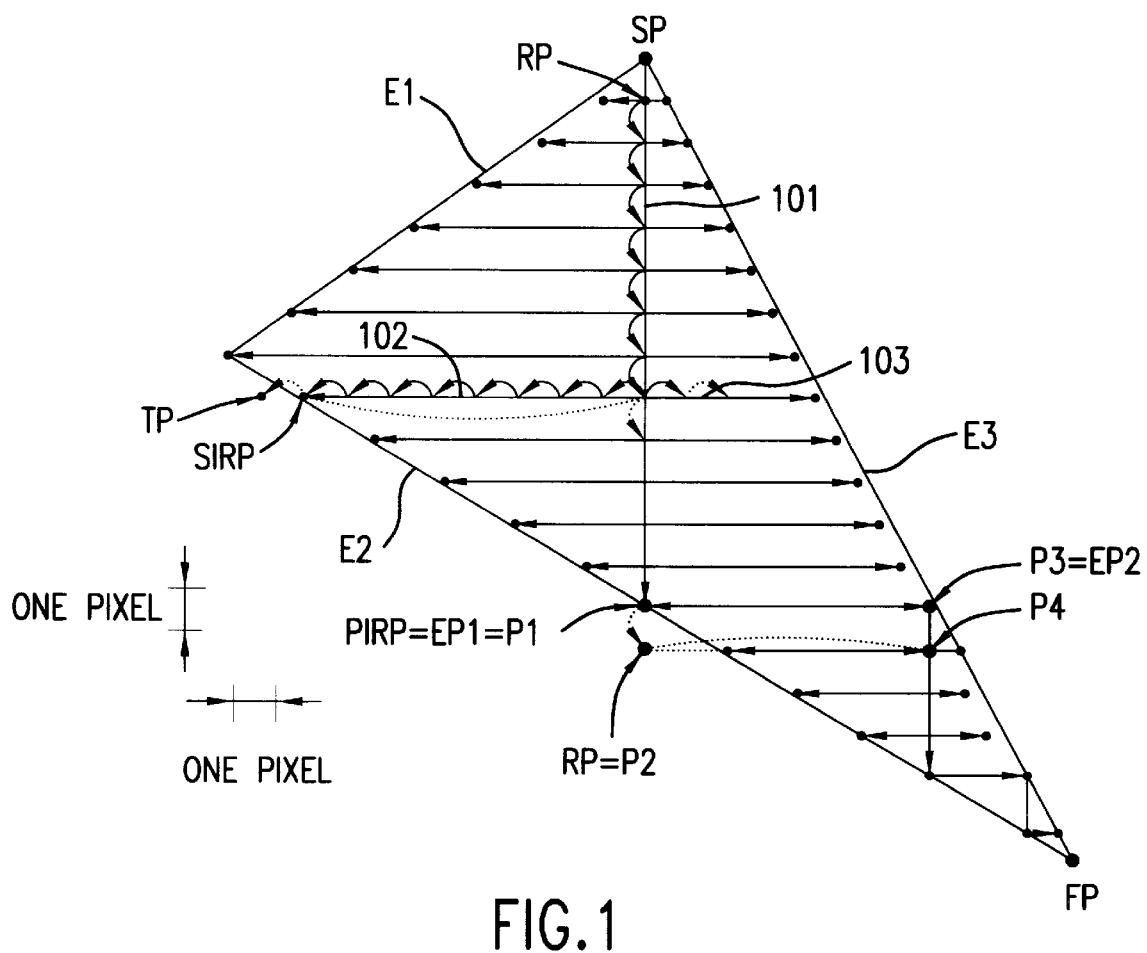
FIG. 1 is a diagram for explaining the triangle traversing method according to the present invention.

Referring to FIG. 1, the traversing is performed in both primary and secondary traversing directions which are orthogonally related. In FIG. 1, the primary traversing direction is downward (i.e., from point SP to point P1). The primary traversing operation determines reference points which are used as starting points in the secondary traversing operation. In FIG. 1, the secondary traversing direction is back and forth laterally (i.e., from point P1 to point P3). Consistent with the orthogonal relationship between primary and secondary traversing, if the primary traversing is performed in the −Y direction, the direction of the secondary traversing is the ±X direction. Also, the triangle to be traversed is defined by three vertices and the traversing is initiated from one of the three vertices.

Figure 2:
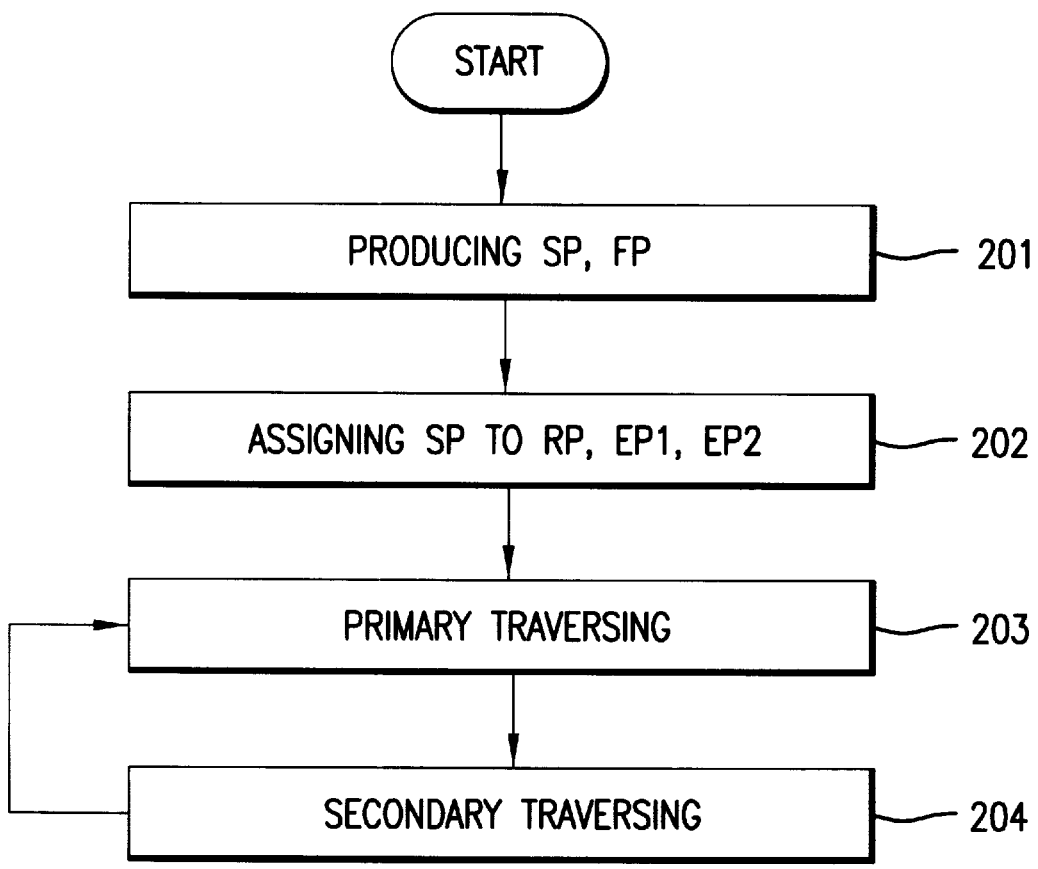
FIG. 2 is a flow chart illustrating the triangle traversing method according to the present invention.

Referring to FIG. 2, in step 201, a starting point SP (FIG. 1) from which traversing is initiated and a final point FP (FIG. 1) at which the traversing terminates are determined in accordance with a selected primary traversing direction. For example, if the primary traversing direction is the +X direction, the starting point SP is determined based on its X-axis coordinate having the minimum value among the three vertices and the final point FP is then determined based on its X-axis coordinate having the maximum value among the three vertices. On the other hand, in the case of the primary traversing being in the −X direction, the starting point (SP) and final point (FP) determination is made such that, among the three vertices, the X-axis coordinate of the starting point SP has the maximum value and that of the final point FP has the minimum value. Meanwhile, for primary traversing in the −Y direction, the starting point has the maximum Y-axis value and the final point FP has the minimum Y-axis value, and vice versa for the +Y direction. Hereinafter, for the convenience of explanation, the primary traversing is assumed to be in −Y direction.

In step 202, the starting point SP is assigned to a reference point RP, a first edge point EP1 and a second edge point EP2.

Figure 3:
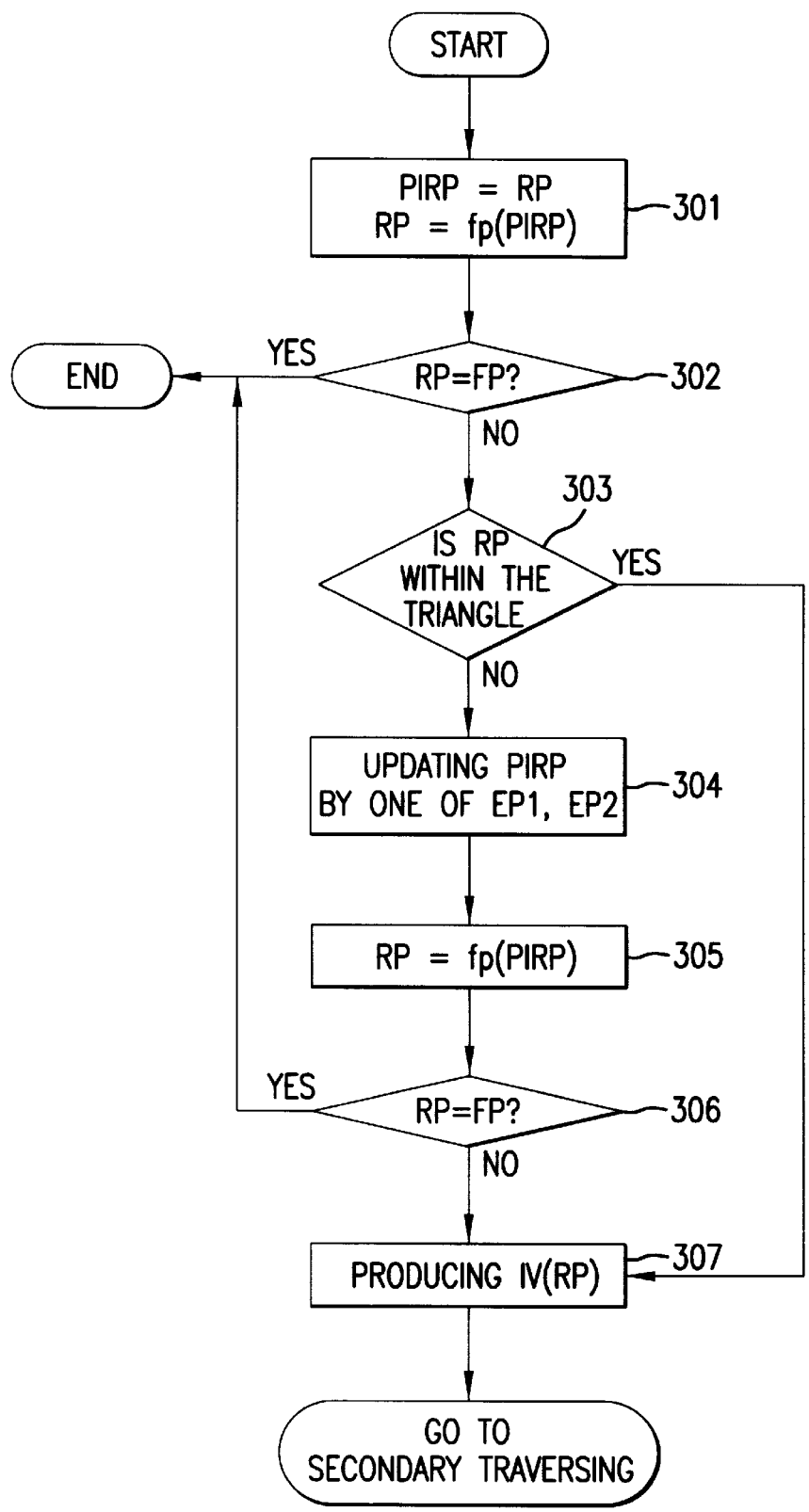
FIG. 3 is a flow chart illustrating the primary traversing step (203) shown in FIG. 2.

Next, in step 203, primary traversing is performed to produce an updated reference point. The primary traversing operation will be explained with reference to FIG. 3.

In step 301, the reference point RP is assigned to the primary interpolation reference point (PIRP) and then the reference point RP is updated such that its address is shifted by one pixel in the primary traversing direction from the primary interpolation reference point PIRP. In other words, vertical proceeding is performed on the reference point RP. The symbol $f_p(PIRP)$ denotes the function governing primary proceeding (in the −Y direction). Next, in step 302, the reference point RP is checked to determine whether it is the same as the final point FP, and if so, the traversing operation ends, but otherwise, step 303 is performed. In step 303, the reference point RP is checked to determine if it is located within the triangle. This checking may be performed by producing three edge function values of the reference point RP and then checking the sign of the three edge function values. For example, if the three edge function values are all positive, the reference point RP is determined to be located within the triangle, but if any one of these is negative, the reference point is located outside the triangle. In particular, if one of the three edge values is zero, the reference point is located at an edge of the triangle. The three edge function values of the reference point RP are produced by interpolation, with reference to the edge function values of the primary interpolation reference point PIRP. This interpolation may be performed, for example, by the method described in the article entitled "A parallel Algorithm for polygon Rasterization" by Juan Pineda appearing in Computer Graphics, Vol. 22, No. 4, 8/88, which is herein incorporated by reference. If the reference point RP is located within the triangle, the image value of the reference point IV(RP) is produced through step 307 and secondary traversing is initiated. Otherwise, the primary interpolation reference point PIRP is shifted in the secondary traversing direction (horizontally) to a point selected between edge points EP1 and EP2 which have been updated in the preceding secondary traversing operation. This selection is made based on the slope of the edge (E1, E2 or E3) corresponding to the negative edge function value.

Referring back to FIG. 1, a specific example of primary traversing is explained. If the point P1 is assigned to the primary interpolation reference point PIRP and the point P2 is assigned to the reference point RP through step 301, the edge function value of the point P2 corresponding to the edge E2 (in FIG. 1) is negative, and it is determined that the point P2 is located outside the triangle in step 303. Here, during the immediately preceding secondary traversing operation, the points P1 and P3 are stored as the first and second edge points EP1 and EP2. Because the slope of the edge E2 having a negative edge function value is negative, horizontal shifting is performed in the +X direction. Accordingly, the point P3 is assigned to the primary interpolation reference point PIRP in step 304.

On the other hand, if the edge corresponding to the negative edge function value has a positive slope, the horizontal shifting of step 304 is performed in the −X direction and the edge point EP1 is selected as the primary interpolation reference point PIRP. Next, in step 305, the reference point RP is determined by performing a primary proceeding from the primary interpolation reference point PIRP. Accordingly, in the above case, the point P4 (in FIG. 1) is set as the reference point RP. In step 306, it is determined whether the reference point RP produced in step 305 is the same as the final point FP. If so, traversing is terminated, and, otherwise, the image value of the reference point RP is produced and secondary traversing is initiated. Here, the image values are calculated using interpolation equations, especially vertical-type interpolation equations, according to fast Phong shading. Here, since step 307 is for shading, it can be substituted by another pixel processing operation (for example, masking). In addition, step 307 can be performed in parallel with the subsequent steps. That is, the secondary traversing may be initiated without the completion of step 307.

As mentioned above, secondary traversing is performed subsequent to each pixel shift of the reference point RP when the reference point RP is different from the final point FP and when the reference point RP is within the triangle. This will be explained with reference to FIG. 4.

Figure 4:
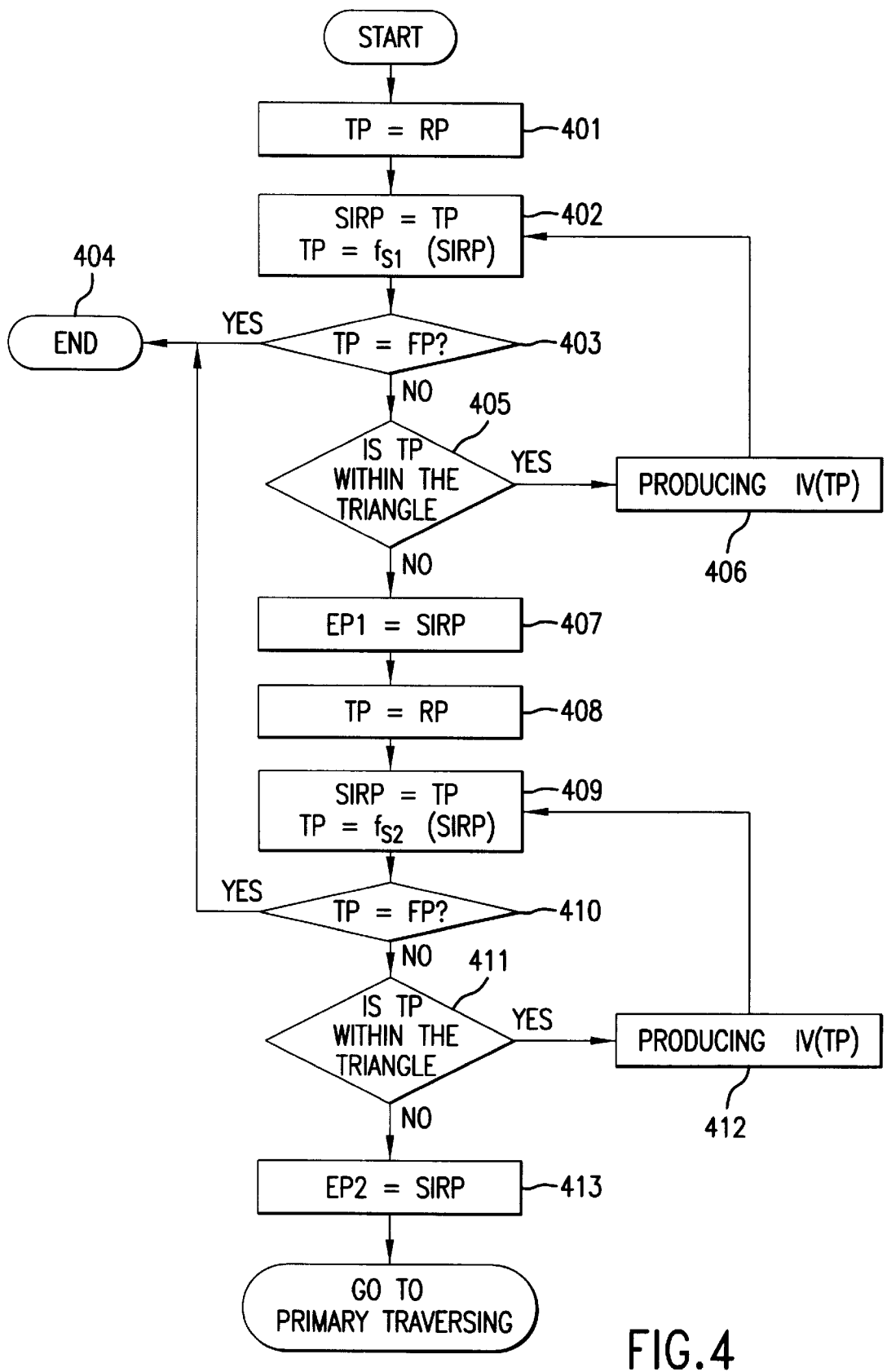
FIG. 4 is a flow chart illustrating the secondary traversing step (204) shown in FIG. 2.

In FIG. 4, if the secondary traversing is performed horizontally, steps 401–407 are for a first horizontal traversing and steps 408–413 are for a second horizontal traversing. Here, if the first horizontal traversing is performed in the −X direction and the second horizontal traversing is performed in the +X direction and two points of the three vertices of the triangle have the same minimum Y-axis coordinate value, then the final point FP is determined between the two points such that its X-axis coordinate has the higher value.

In step 401, the reference point RP is assigned to the traversing point TP. In step 402, the traversing point TP is assigned to the secondary interpolation reference point SIRP and an updated traversing point TP is produced such that its address is shifted by one pixel in the secondary traversing direction from the secondary interpolation reference point SIRP. In other words, the traversing point TP proceeds in a predetermined horizontal direction. The symbol $f_{S1}$ (SIRP) denotes the function governing secondary proceeding in the −X direction. The traversing point TP is checked to determine if it is the same as the final point FP in step 403. If so, the traversing is ended in step 404. Otherwise, the traversing point TP is checked to determine if it is located within the triangle in step 405, and, if so, its image values are calculated in step 406 and the process returns to and step 402. Accordingly, steps 406, 402, 403 and 405 are repeatedly performed until all points between the left edge and reference point RP are traversed. Here, as step 406 is for shading, it can be substituted by another pixel processing operation and performed in parallel with the subsequent steps 402, 403 and 405.

The calculation of step 406 is performed by using interpolation equations according to fast Phong shading, with reference to the image values of the secondary interpolation reference point SIRP. In other words, horizontal interpolation equations are adopted in step 406.

When the traversing point TP is located outside the triangle, the first edge point EP1 is updated to the secondary interpolation reference point as depicted in FIG. 1 (this corresponds to the left outermost point of the horizontal line). In step 408, the traversing point TP is updated by the reference point RP. In step 409 the traversing point TP is assigned to the secondary interpolation reference point SIRP and then the traversing point TP is updated such that its address is shifted by one pixel in the second horizontal direction (i.e., the +X direction) from the secondary interpolation reference point SIRP. The symbol $f_{S2}$ (SIRP) denotes the function governing −X-direction proceeding. The traversing point TP is checked to determine if it is the same as the final point FP in step 410. If so, the traversing is ended in step 404, and otherwise, the traversing point TP is checked to determine if it is located within the triangle in step 411. If the traversing point TP is located within the triangle, its image values are calculated in step 412. Though the interpolation equations used in step 412 originate from the fast Phong shading algorithm, they are different from those used in step 407 because the shifting direction of step 409 is opposite that of step 402. Next, step 409 is performed. Accordingly, steps 412, 409, 410, and 411 are repeatedly performed until all the points located between the reference point RP and the right edge are traversed. Here, as step 412 is also for shading, it can be substituted by another pixel processing and performed in parallel with the subsequent steps 409, 410 and 411. If it is determined that traversing point TP is located outside the triangle in step 411, the second edge point EP2 is updated to the secondary interpolation reference point (this corresponds to the right outermost point of the horizontal line within the triangle). After the secondary traversing (that is, horizontal outward traversing) corresponding to the reference point RP is finished, the primary traversing operation is resumed. The updated edge points EP1 and EP2 are used in the resumed primary traversing operation. In other words, until the final point FP is traversed, the primary traversing and the secondary traversing are repeatedly performed.

Figure 5:
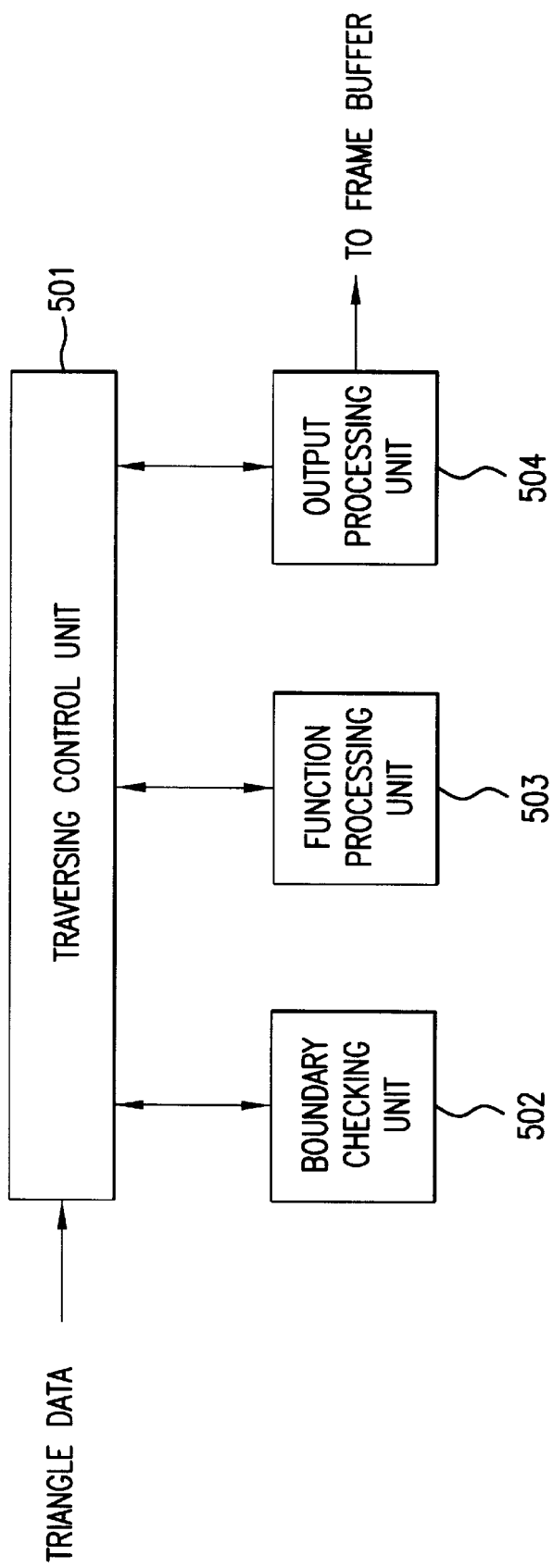
FIG. 5 is a block diagram of a rasterizer using the triangle traversing method of the present invention.

FIG. 5 is a block diagram of a rasterizer using the triangle traversing method of the present invention. The rasterizer includes a traversing control unit 501, a boundary checking unit 502, a function processing unit 503 and an output processing unit 504.

Referring to FIG. 5, traversing control unit 501 receives three vertices defining a triangle and their image data and produces addresses according to the triangle traversing method described with respect to FIGS. 1–4. Boundary checking unit 502 performs the function corresponding to steps 303, 405 and 411. That is, boundary checking unit 502 checks whether the current scanning point is located within the triangle. The term "scanning point" encompasses the reference point RP and the traversing point TP. Boundary checking unit 502 receives the three vertices and the address related to the current scanning point and produces three edge function values related to the current scanning point. If any one of the three edge function values is a located-out value (for example, negative), the current scanning point is determined to be located outside the triangle. In addition, boundary checking unit 502 produces a selection signal to be used in step 304, in accordance with the slope of the edge having the located-out edge function value. If boundary checking unit 502 adopts interpolation equations for producing the three edge function values, the interpolation reference point would be loaded from traversing control unit. Function processing unit 503 produces the image values of the current scanning point determined to be located within the triangle, and corresponds to steps 307, 406 and 412 of FIGS. 3 and 4. Also, these steps, as described above, can be performed in parallel with their subsequent steps and can be substituted by another pixel processing operation. Output processing unit 504 performs hidden-surface elimination for the scanning point whose image values have been produced, and then updates the image data of a frame buffer.

The rasterizer depicted in FIG. 5 may be implemented using a subpixel mask generator such as that described in commonly assigned U.S. patent application entitled "Method for Generating a Subpixel Mask for Computer Graphics System and Apparatus Thereof" filed Sep. 22, 1994, which is herein incorporated by reference.

As describe above, the triangle traversing method according to the present invention eliminates needless calculations so as to increase the speed of image processing in a computer graphics system.

Though explained in terms of detailed embodiments, the present invention is not limited to these embodiments but may be modified and improved within the scope of knowledge of one having ordinary skill in this field.

What is claimed is:

1. In a computer graphics system including a rasterizer, a method of operation of the rasterizer including a method for traversing a triangle defined by three vertices, comprising:

assigning first and second vertices as a starting point and a final point, respectively;

assigning a reference point, a first edge point and a second edge point to the starting point;

conducting primary traversing including 1) shifting the reference point by one pixel in a primary traversing direction 2) producing a plurality of edge function values of the shifted reference point to determine whether the shifted reference point is located within the triangle, conducting secondary traversing from the shifted reference point including further shifting the shifted reference point in a secondary traversing direction until the points of a line within the triangle connecting first and second edges are all traversed and 2) storing the two outermost points traversed in the secondary traversing as updated first and second edge points, respectively, 3) producing image values of the shifted reference point when the shifted reference point is within the triangle; and repeatedly performing said primary traversing and said secondary traversing, until said final point is traversed.

2. A method for traversing triangle according to claim 1, wherein said primary traversing includes selecting one between the updated first edge point and the updated second edge point, provided that any one of the plurality of edge function values is a located-out value, wherein the selection is made based on the slope of an edge having a corresponding located-out edge function value, and assigning a point shifted by one pixel in the secondary traversing direction from the selected edge point as the shifted reference point and then producing image values of the shifted reference point.

3. A method for traversing a triangle according to claim 2, wherein the image values are produced using a quadratic interpolation of fast Phong shading.

4. A method for traversing triangle according to claim 1, wherein the primary traversing direction is the −Y direction and the secondary traversing direction includes the ±X directions.

5. A rasterizer comprising:

a traversing control unit for producing an address of a point by 1) assigning first and second vertices of a triangle as a starting point and a final point, respectively, 2) assigning a scanning point, a first edge point and a second edge point to the starting point;

a boundary checking unit for checking whether the traversing point is located within the triangle;

a function processing unit for producing the image values of the scanning point if the scanning point has been determined to be located within the triangle and for shifting the scanning point to a point within the triangle if the scanning point is determined to be located outside the triangle; and an output processing unit for performing a hidden-surface elimination for the scanning point that is located within the triangle.

6. In a computer graphics system including a rasterizer, a method of operation of the rasterizer including a method for traversing a triangle defined by three vertices, the method comprising:

determining first and second vertices of the triangle as a starting point and a final point, respectively, based on a primary traversing direction;

assigning the starting point to a reference point, a first edge point and a second edge point;

performing primary traversing including 1) shifting the reference point by one pixel in the primary traversing direction, 2) determining whether the shifted reference point is within the triangle, and 3) if the shifted reference point is not within the triangle, further shifting the reference point in the primary traversing direction to one of the first and second edge points and in a secondary traversing direction to the other of the first and second edge points.

7. A method for traversing a triangle according to claim 6 wherein said primary traversing step includes:

producing three edge function values of the reference point shifted in 1) in order to check whether the shifted reference point is located within the triangle;

producing image values of the shifted reference point, provided that the three edge function values are all located-in values;

selecting one of the first edge point and the second edge point, provided that any one of the three edge function values is a located-out value, wherein the selection is made based on the slope of an edge having a corresponding located-out edge function value; and further shifting the reference point shifted in 3) by one pixel in the primary traversing direction from the selected edge point and producing image values of the further shifted reference point.

8. A method for traversing a triangle according to claim 7 wherein the image values are produced using a quadratic interpolation of fast Phong shading.

9. A method for traversing a triangle according to claim 7 wherein the primary traversing direction is orthogonal to the secondary traversing direction.

* * * * *